United States Patent
Mair et al.

(10) Patent No.: US 8,278,637 B2
(45) Date of Patent: Oct. 2, 2012

(54) PROCESS AND APPARATUS FOR READING OUT AND ERASING X-RAY INFORMATION STORED IN STORAGE PHOSPHOR LAYERS

(75) Inventors: Stephan Mair, Augsburg (DE); Thomas Hartmann, Uffing am Staffelsee (DE); Bernd Gerstlauer, Munich (DE)

(73) Assignee: Agfa HealthCare N.V., Mortsel (BE)

( * ) Notice: Subject to any disclaimer, the term of this patent is extended or adjusted under 35 U.S.C. 154(b) by 187 days.

(21) Appl. No.: 12/854,735

(22) Filed: Aug. 11, 2010

(65) Prior Publication Data
US 2011/0049397 A1 Mar. 3, 2011

(30) Foreign Application Priority Data
Aug. 31, 2009 (EP) .................... 09169024

(51) Int. Cl.
*G03B 42/08* (2006.01)
(52) U.S. Cl. ....................... 250/586; 250/588
(58) Field of Classification Search ............... 250/484.2, 250/580, 581, 582, 584, 585, 586, 587, 588, 250/591
See application file for complete search history.

(56) References Cited

U.S. PATENT DOCUMENTS

| | | | |
|---|---|---|---|
| 4,687,937 A | 8/1987 | Aagano et al. |
| 4,786,808 A | 11/1988 | Saito |
| 4,816,678 A | 3/1989 | Takasaki |
| 5,072,119 A | 12/1991 | Yamaguchi |
| 6,373,074 B1 | 4/2002 | Mueller et al. |
| 7,170,080 B2 | 1/2007 | Fasbender et al. |
| 7,304,316 B2 | 12/2007 | Mair |
| 7,312,467 B2 | 12/2007 | Gerstlauer et al. |
| 7,329,891 B2 | 2/2008 | Frankenberger et al. |
| 7,465,949 B2 | 12/2008 | Kahlert et al. |
| 7,465,950 B2 | 12/2008 | Mair et al. |
| 7,498,597 B2 | 3/2009 | Bode et al. |

(Continued)

FOREIGN PATENT DOCUMENTS
EP 0 167 835 A1 1/1986
(Continued)

OTHER PUBLICATIONS
U.S. Appl. No. 12/717,261, filed Mar. 4, 2010, by Luc Struge et al.
(Continued)

*Primary Examiner* — Mark R Gaworecki
(74) *Attorney, Agent, or Firm* — Houston & Associates, LLP

(57) ABSTRACT

A process, and to a corresponding apparatus for reading out and erasing X-ray information stored in storage phosphor layers, comprising the following: irradiating the storage phosphor layer (1) with stimulation light (3) by means of which the storage phosphor layer (1) is stimulated to emit emission light, collecting the emission light emitted at different locations (x, y) of the storage phosphor layer (1) with a detector (7), detector signal values (D(x, y)) being obtained for different locations (x, y) of the storage phosphor layer (1), and irradiating the storage phosphor layer (1) with erasing light (21), the quantity of erasing light (21) being determined by means of the detector signal values (D(x, y)). When determining the quantity of erasing light (21), detector signal values (D(x, y)) obtained for different locations (x, y) in a first and second dimension (x or y) of the storage phosphor layer (1) are compared with comparison signal values (H(x), H'(x)) specified for different locations (x) in just one dimension (x) of the storage phosphor layer (1).

19 Claims, 2 Drawing Sheets

U.S. PATENT DOCUMENTS

| | | |
|---|---|---|
| 7,504,650 B2 * | 3/2009 | Suzuki ........................ 250/588 |
| 7,507,984 B2 | 3/2009 | Bode et al. |
| 7,541,606 B2 | 6/2009 | Zemánek et al. |
| 7,601,973 B2 | 10/2009 | Frankenberger et al. |
| 7,612,357 B2 | 11/2009 | Mair et al. |
| 7,633,078 B2 | 12/2009 | Bode et al. |
| 2005/0285061 A1 | 12/2005 | Gerstlauer et al. |
| 2008/0055587 A1 | 3/2008 | Scherer et al. |

FOREIGN PATENT DOCUMENTS

| | | |
|---|---|---|
| EP | 1 034 443 B1 | 9/2000 |
| EP | 1 612 582 A1 | 1/2006 |
| EP | 1 612 583 A1 | 1/2006 |
| EP | 1 653 481 A1 | 5/2006 |
| EP | 1 669 777 A1 | 6/2006 |
| EP | 1 691 215 A1 | 8/2006 |
| EP | 1 691 216 A1 | 8/2006 |
| EP | 1 691 217 A1 | 8/2006 |
| EP | 1 804 082 A1 | 4/2007 |
| EP | 1 804 081 A1 | 7/2007 |
| EP | 1 895 324 A1 | 3/2008 |
| EP | 1 895 325 A1 | 3/2008 |
| EP | 1 895 326 A1 | 3/2008 |
| EP | 1 895 327 A1 | 3/2008 |
| EP | 1 895 758 A1 | 3/2008 |

OTHER PUBLICATIONS

European Search Report dated Jun. 30, 2010, from priority application No. EP 09169024, filed on Aug. 31, 2009.

* cited by examiner

PROCESS AND APPARATUS FOR READING OUT AND ERASING X-RAY INFORMATION STORED IN STORAGE PHOSPHOR LAYERS

RELATED APPLICATIONS

This application claims priority to European Patent Application No. EP09169024.8, filed on Aug. 31, 2009, which is incorporated herein by reference in its entirety.

BACKGROUND OF THE INVENTION

With so-called computer radiography (CR), X-ray images are recorded by the X-ray radiation passing through an object, for example a patient, being stored in a so-called storage phosphor layer as a latent image. In order to read out the stored image the storage phosphor layer is irradiated with stimulation light and thus stimulated to emit emission light. The emission light, the intensity of which corresponds to the image stored in the storage phosphor layer, is collected by a detector and converted into electric signals. The electric signals are further processed as required, and finally provided for analysis, in particular for medical/diagnostic purposes, by them being displayed on an appropriate display device, such as e.g. a monitor or printer. After the read-out of the stored image the storage phosphor layer is irradiated with erasing light in order to totally erase any remaining X-ray information, and is then available for the recording of further X-ray images.

With the processes described in U.S. Pat. No. 5,072,119 and EP 0 167 835 A1 the quantity of erasing light radiated onto the storage phosphor layer when erasing is determined by means of the maximum value of the electric signals generated by the detector when reading out the storage phosphor layer. With the apparatus known from U.S. Pat. No. 4,786,808 for different strip-shaped regions of the storage phosphor layer a maximum signal value of the electric signals generated by the detector is also respectively used in order to determine from this the quantity of erasing light respectively used when erasing the strip-shaped regions.

SUMMARY OF THE INVENTION

With the known apparatuses and processes it cannot be guaranteed in all applications that the quantity of erasing light used when erasing the storage phosphor layer is as low as possible in order to keep the development of heat caused by the erasing light and the associated energy consumption and material wear as low as possible and to keep the time spent by the storage phosphor layer in the erasing unit as short as possible so that the highest possible throughput of storage phosphor layers to be read out through the apparatus is achieved.

The present invention relates to a process and to a corresponding apparatus for reading out and erasing X-ray information stored in storage phosphor layers. It is an object of the invention to specify a process and a corresponding apparatus with which the quantity of erasing light is on the one hand sufficiently great in order to erase as completely as possible the X-ray information remaining in the storage phosphor layer, and is on the other hand as small as possible in order to avoid an unnecessarily high degree of heat development and to guarantee a high throughput of storage phosphor layers to be read out through the apparatus.

According to embodiments of the invention, when determining the quantity of erasing light when reading out the storage phosphor layer, the detector signal values obtained for different locations in a first and second dimension of the storage phosphor layer are compared with comparison signal values specified for different locations in just one dimension of the storage phosphor layer.

Aspects of the invention are based upon the idea of comparing the detector signal values obtained when reading out different locations of the two-dimensional storage phosphor layer with comparison signal values which are specified for different locations in just one of the two dimensions of the storage phosphor layer. Preferably the comparison signal values are determined before reading out and erasing the storage phosphor layer in a separate calibrating process.

If the storage phosphor layer lies in a plane stretching through the x and y axes of a coordinate system, when reading out the storage phosphor layer a plurality of detector signal values are obtained the level of which is dependent upon each respective location with the coordinates x and y on the storage phosphor layer. These detector signal values are compared with comparison signal values which are only specified along one dimension of the storage phosphor layer, i.e. along the x or y direction. If the comparison signal values are only specified in the x direction, the detector signal values obtained for locations with a specific x coordinate and different y coordinates are compared with the corresponding comparison signal value for this x coordinate. If, however, the comparison signal values are only specified in the y direction, the detector signal values obtained for locations with a specific x coordinate and different x coordinates are compared with the corresponding comparison signal value for this y coordinate.

By comparing the detector signal values for different locations in the two dimensions of the storage phosphor layer with the comparison signal values specified or determined in just one dimension of the storage phosphor layer it can be concluded simply and reliably whether a greater or smaller quantity of erasing light is required or sufficient in order to erase the X-ray information remaining in the storage phosphor layer, in order on the one hand to guarantee complete erasure of the remaining X-ray information, and on the other hand to avoid an unnecessarily high degree of heat development and to guarantee a high throughput.

In one preferred embodiment of the invention a first quantity of erasing light is chosen if the number of detector signal values, which are greater than the corresponding comparison signal values, is not larger than a specified number, and a second quantity of erasing light, which is greater than the first quantity of erasing light, is chosen if the number of detector signal values, which are greater than the corresponding comparison signal values, is larger than the specified number. In this way the greater second quantity is only chosen if a larger number than the specified number of detector signal values exceeds the corresponding comparison signal values. If the specified number is e.g. 800, the smaller first quantity of erasing light is chosen if a maximum of 800 of the detector signal values obtained when reading out the storage phosphor layer are greater than the corresponding comparison signal values. The greater second quantity of erasing light is chosen, however, if more than 800 of the detector signal values obtained when reading out the storage phosphor layer are greater than the corresponding comparison signal values. In this way detector signal values which derive from interference when collecting the emission light with the detector, e.g. due to statistical discharges or bolts of lightning, and manifested as statistical runaway values in the image information collected, are eliminated when determining the required quantity of erasing light. Determination of the required and at the same time sufficient quantity of erasing light is particularly reliable here.

Preferably, the specified number is between 200 and 1500, in particular between 500 and 1000. By choosing the specified number the effect of interference when collecting the emission light can be specifically eliminated, in particular dependently upon the type of storage phosphor layer, the respective application and/or the X-ray dose used for the respective recording, by means of which reliability is further increased when determining the required quantity of erasing light.

In a further advantageous embodiment the storage phosphor layer is irradiated with stimulation light of a stimulation light source by means of which a stimulation light beam moves over the storage phosphor layer along a line extending in a first dimension or the storage phosphor layer is illuminated linearly along the line, and the storage phosphor layer is moved relative to the stimulation light source in the second dimension. In the first mentioned version this is a so-called flying spot scanner which will be described in greater detail below. With the latterly mentioned version with linear illumination of the storage phosphor layer this is a so-called line scanner which is described in greater detail, for example, in EP 1 034 443 A1. With both versions the stimulation light source and the detector can be fixed in position, and the storage phosphor layer can be moved along the second dimension past the latter. Alternatively, the storage phosphor layer is fixed during read-out, and the stimulation light source and the detector are conveyed along the second dimension past the latter. However, both the storage phosphor layer and the stimulation light source and the detector can basically be moved at the same time.

With this embodiment the first dimension is called the fast scan direction or main scan direction, and the second dimension is called the slow scan direction or the sub scan direction. Preferably, when determining the quantity of erasing light the detector signal values obtained for different locations in the first and second dimension, i.e. in the fast scan and the slow scan direction, are compared with the comparison signal values specified and determined for different locations in just the first dimension, i.e. in the fast scan direction. In this way, when determining the quantity of erasing light any variations occurring in the behavior of the detector and/or light collector in the fast scan direction when collecting the emission light are taken into account. This enables particularly reliable determination of the quantity of erasing light required.

The specified comparison signal values can be determined using a calibrating process and/or in a corresponding apparatus. The calibrating method and the corresponding apparatus are closely related to the process according to embodiments of the invention and the apparatus according to the embodiments of invention for reading out and erasing the X-ray information stored in storage phosphor layers, and can also be implemented and operated autonomously and independently of the latter, i.e. without the process according to the invention and the apparatus according to the invention.

In general, according to one aspect, the invention features a calibrating method that comprises:

recording of comparison information in a storage phosphor layer by irradiating the storage phosphor layer with X-ray radiation of a specific intensity, in particular an intensity which is constant in the region of the storage phosphor layer (so-called flat field recording), reading out the comparison information by irradiating the storage phosphor layer with stimulation light by means of which the storage phosphor layer is stimulated to emit emission light, and collecting the emission light emitted at different locations in a first and second dimension of the storage phosphor layer with a detector, comparison signal initial values being obtained for different locations in the first and second dimension of the storage phosphor layer, and determining the comparison signal values for different locations in just one dimension of the storage phosphor layer by averaging the comparison signal initial values along the other dimension of the storage phosphor layer.

In general, according to another aspect, the invention features an apparatus for determining comparison signal values comprising an X-ray radiation source for irradiating a storage phosphor layer with X-ray radiation of a specific intensity, in particular an intensity which is constant in the region of the storage phosphor layer, comparison information being recorded in the storage phosphor layer, a read-out unit for reading out the comparison information, the read-out unit comprising a stimulation light source for irradiating the storage phosphor layer with stimulation light by means of which the storage phosphor layer is stimulated to emit emission light, and a detector for collecting the emission light emitted at different locations of the storage phosphor layer, corresponding comparison signal initial values being obtained, and a control unit for determining the comparison signal values for different locations in just one dimension of the storage phosphor layer by averaging the comparison signal initial values along the other dimension of the storage phosphor layer.

In a preferred embodiment the apparatus for determining the comparison signal values comprises a memory in which the comparison signal values determined in the control unit can be stored, and the control unit is designed to determine a quantity of erasing light with which a storage phosphor layer is irradiated in order to erase X-ray information remaining in the storage phosphor layer using the comparison signal values stored in the memory.

The storage phosphor layer with which the calibrating process is implemented does not need to be identical to the storage phosphor layer from which the stored X-ray information is read out. It is sufficient if when calibrating on the one hand and when reading out and erasing on the other hand these are storage phosphor layers of the same type.

With the calibrating process described and in the corresponding apparatus the originally two-dimensional data field of the comparison signal initial values is reduced to a one-dimensional data field of comparison signal values which requires substantially less storage space. Despite the great reduction in data in this way a high level of reliability is nevertheless guaranteed when determining the required, smallest possible quantity of erasing light.

Advantageously the comparison signal values are determined for different locations in the first dimension, in particular in the fast scan or main scan direction, of the storage phosphor layer by averaging the comparison signal initial values along the second dimension, in particular the slow scan or sub scan direction. In this way any variations occurring in the behavior of the detector and/or light collector in the fast scan direction when collecting the emission light can also be taken into account in the calibrating process. This guarantees particularly reliable determination of the comparison signal values and in this way guarantees an even higher degree of reliability when determining the required quantity of erasing light.

In a further embodiment of the process provision is made such that the comparison signal values obtained by averaging along the second dimension are also averaged along the first dimension in such a way that the comparison signal values lying in a number of sections along the first dimension are respectively averaged so that averaged comparison signal values are obtained for the locations within the respective sections. Preferably, for each section along the first dimension between 50 and 200, in particular between 80 and 120, comparison signal values are averaged. Depending on the number of comparison signal values also averaged along the first dimension, the storage space required for storing the averaged comparison signal values is therefore further reduced by a factor lying in the order of magnitude of 100 without, however, having any significant effect upon reliability when determining the smallest possible quantity of erasing light.

It is advantageous to average the comparison signal initial values and/or comparison signal values by forming the median value. The median value, also called the central value, specifies the comparison signal initial value or comparison signal value above which half of the comparison signal initial values or comparison signal values and below which half of the comparison signal initial values or comparison signal values come. In comparison with the arithmetical mean value, also called the average, the advantage of the median value is that it is more robust in the face of runaway values, i.e. extremely deviating values.

Moreover, it is preferred if the comparison signal values for different storage phosphor layer types, e.g. Powder Image Plates (PIP) or Needle Image Plates (NIP) and/or radiographic applications, such as e.g. general radiography or mammography, and/or X-ray beam doses, are determined. In this way it is made possible to determine the quantity of erasing light matched to the storage phosphor layer type, the application and optionally the X-ray dose and which is therefore particularly accurate.

When reading out and erasing a specific storage phosphor layer it is preferably initially established which storage phosphor layer type and/or which radiographic application this is and/or which dose of X-ray radiation was used when recording the X-ray information. This is established before the read-out and erasure process preferably by retrieving information on the storage phosphor layer type, the radiographic application and the X-ray radiation dose stored in an electronic memory. This information is preferably stored in an electronic memory which is located on a cassette in which the storage phosphor layer is located, or applied to the storage phosphor layer itself, for example on a carrier layer of the storage phosphor layer.

Preferably, when reading out the X-ray information stored in the storage phosphor layer the detector signal values obtained are set to a specified detector signal value if a limit dose of X-ray radiation or a corresponding maximum detector signal value stored in the storage phosphor layer is exceeded, and when reading out the comparison information stored in the storage phosphor layer a comparison signal initial value corresponding to the level of the respective stored dose of X-ray radiation is emitted, even if the limit dose of X-ray radiation or the corresponding maximum detector signal value stored in the storage phosphor layer is exceeded. When reading out the storage phosphor layer image information is thus obtained just for those locations in which the corresponding detector signal values lie below the maximum detector signal value. In the calibrating process, however, when determining the comparison signal values the whole region in which finite comparison signal initial values are obtained is used. In this way, on the one hand when reading out X-ray information regions of the X-ray image in which the limit dose has been exceeded are shown consistently in black and white, and on the other hand in the calibrating process it is nevertheless made possible to collect corresponding, finite comparison signal initial values with X-ray doses which exceed the limit dose.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
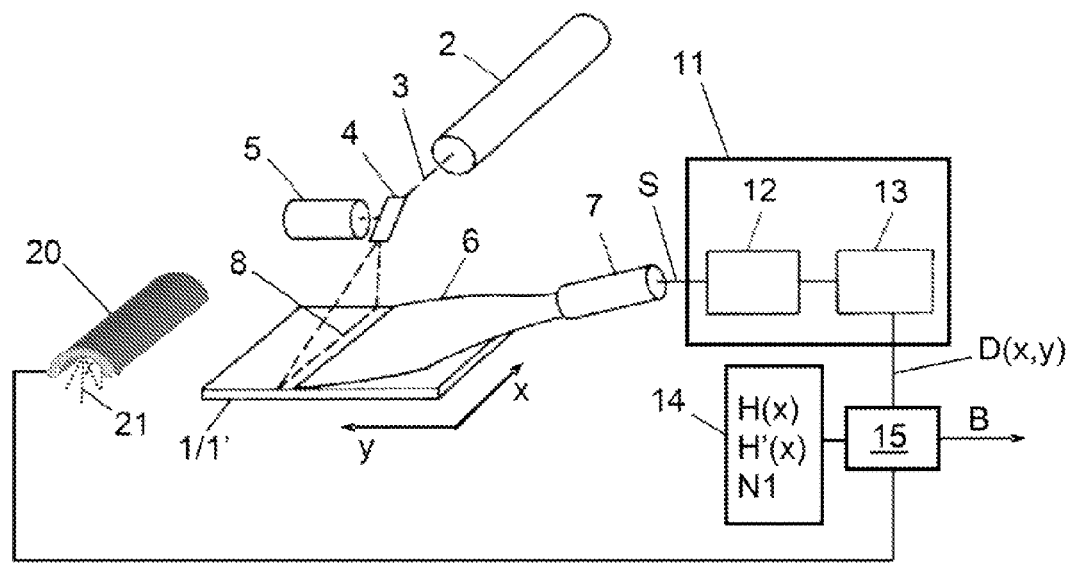
FIG. 1 is a schematic diagram of an apparatus for reading out and erasing a storage phosphor layer.

FIG. 1 shows an apparatus for reading out and erasing a storage phosphor layer 1. By means of a laser 2 a stimulation light beam 3 is generated which is deflected by a deflection element 4 set in rotation by a motor 5, in this case a rotating polygon mirror, such that the latter moves along a line 8 extending in a first dimension x over the storage phosphor layer 1 to be read out. Instead of a polygon mirror a galvanometer mirror can also be used as a deflection element 4.

During the movement of the stimulation light beam 3 along the line 8 the storage phosphor layer 1 emits emission light depending on the X-ray information stored therein which is collected and bundled by an optical collecting device 6, for example an optical fiber bundle or appropriate imaging optics, is forwarded and collected by a detector 7 coupled to the collecting device 6, preferably a photomultiplier tube (PMT) and converted into a corresponding analog detector signal S.

The analogue detector signal S is delivered to a processing device 11 where it is initially filtered through a low pass filter 12, higher frequency portions of the detector signal S, in particular noise portions, being eliminated or at least reduced.

The filtered, analogue detector signal S is delivered to a digitalization device 13 and sampled here with a specified sampling frequency and digitalized, a digital detector signal value D being obtained for each sampling process. The sampling frequency is typically between 1 and 12 MHz. The sampling of the analogue detector signal S in the digitalization device 13 is preferably implemented using the so-called sample and hold principle with which the respective current analogue signal level of the detector signal S applied to the digitalization device 13 at a sampling time is held and converted into a corresponding digital detector signal value D.

By means of a movement of the storage phosphor layer 1 in the direction of a second dimension y relative to the read-out unit which comprises the stimulation light source 2, 4 and 5 and the optical collecting device 6 and the detector 7, individual lines 8 of the storage phosphor layer 1 extending in the first dimension x are successively stimulated to emit emission light which is collected by the detector 7 and converted in the processing device 11 into corresponding digital detector signal values D. In this way a digital detector signal value D(x, y) is respectively obtained for a plurality of locations (x, y) in the first and second dimension x and y of the storage phosphor layer 1.

The first dimension x is also called the x direction, fast scan direction or main scan direction, and the second dimension y is also called the y direction or slow scan direction or sub scan direction.

Finally, from the digital detector signal values D(x, y) intermediately stored in a memory (not shown) image signal values B are determined for individual pixels in a control unit 15 by e.g. two or more detector signal values D(x, y) being combined to form one pixel, and from this—preferably by determining the median value—an image signal value B belonging to this pixel is calculated. The totality of the image signal values B calculated from the detector signal values D(x, y) then forms a two-dimensional X-ray image which can finally be displayed on a monitor or be issued by a printer.

The apparatus has an erasing unit 20 with which after the read-out of the X-ray information stored therein the storage phosphor layer 1 is irradiated with erasing light 21 in order to totally erase any X-ray information remaining in the storage phosphor layer 1. The erasing device 20 is illustrated in a strongly schematised manner in the example shown here and in addition to a suitable reflector arrangement comprises one or more light sources, e.g. a lamp or light diodes, for emitting erasing light 21 in a specific wavelength spectrum. Alternatively, the erasing unit 20 can also comprise light sources which generate erasing light 21 in different wavelength spectra. Further possible embodiments of the erasing unit 20 are described in greater detail in publications U.S. Pat. No. 7,633,078 B2 (EP 1 895 325 A1), U.S. Pat. No. 7,498,597 B2 (EP 1 895 326 A1), and U.S. Pat. No. 7,507,984 B2 (EP 1 895 327 A1), the contents of which are herewith incorporated as part of the disclosure of preferred embodiments of the invention, by this reference.

The erasing unit 20 can be disposed in different positions relative to the read-out unit 2 and 4 to 6. In the example shown—as viewed in the y direction—it is disposed after the read-out unit 2 and 4 to 7 so that it is passed through by the storage phosphor layer 1 directly after read-out. Alternatively—as viewed in the y direction—the erasing unit 20 can also be disposed before the read-out unit 2 and 4 to 7, the direction of conveyance of the storage phosphor layer 1 having to be reversed first of all after read-out so that the latter can pass through the erasing unit 20.

The apparatus is controlled in such a way that a specific quantity of erasing light 21 with which the storage phosphor layer 1 is irradiated during erasure is specified by the control unit 15. The quantity of erasing light 21 constitutes a measure for the light energy striking the storage phosphor layer 1 during the erasing process per unit of area. Preferably the quantity of erasing light is specified by the choice of intensity and/or duration of the erasing light 21 emitted by the erasing unit 20 and/or the speed of conveyance of the storage phosphor layer 1 relative to the erasing unit 20.

The quantity of erasing light 21 chosen for the erasing process is determined in the control unit 15 by means of the detector signal values D(x, y) by the latter being compared with specified comparison signal values H(x) or H'(x) which are stored in a calibrating process for different locations in just one dimension of the storage phosphor layer 1, namely in the x direction or fast scan direction and in a memory 14. Details of the calibrating process are described in greater detail below.

With the method according to the invention for reading out and erasing the detector signal values D(x, y) obtained with a respective fixed y-position when reading out a line 8 extending in the x direction are compared with the corresponding comparison signal values H(x) and H'(x) extending in the x direction. If a detector signal value D(x, y) is greater here than the corresponding comparison signal value H(x) or H'(x), a counter N is increased by the number 1. This comparison is repeated for all further detector signal values D(x, y) which are obtained with respective fixed y positions when reading out further lines 8 extending in the x direction. In this way all detector signal values D(x, y) obtained are compared line by line with the corresponding comparison signal values H(x) and H'(x).

At the end of this comparison it is checked in the control device 15 whether the counter reading N is greater than a particular specified number N1 which is also stored in the memory 14. If this is not the case a first quantity of erasing light 21 is chosen. If, on the other hand, the counter reading N is greater than the specified number N1, a second quantity of erasing light 21, which is greater than the first quantity of erasing light 21, is chosen. In this way it is achieved that a greater quantity of erasing light is only chosen if a sufficiently large number N of detector signal values D(x, y) is greater than the corresponding comparison signal values H(x) and H'(x). In this way the detector signal values which derive from interference when the detector 7 collects the emission light, for example due to statistical discharges or bolts of lightning, are eliminated when determining the required quantity of erasing light.

Preferably the specified number N1 comes within the range between approximately 200 and 1500, in particular between 500 and 1000. By specifying the number N1 the effect of such interference can be specifically suppressed.

With the calibrating process according to embodiments of the invention a storage phosphor layer 1' is initially irradiated with X-ray radiation generated by an X-ray source (not shown) of a specific intensity which is substantially constant in the region of the storage phosphor layer 1'. Due to the substantially constant intensity this type of X-ray recording is also called a flat field recording.

Typical values of the X-ray radiation dose with which the storage phosphor layer 1' is irradiated come within the range of approximately 100 mR or 300 mR. Since these doses are substantially higher than the X-ray doses generally to be found when reading out an X-ray image of up to approximately 50 mR, the recording of comparison information undertaken during calibration in the storage phosphor layer 1' is also called high-dose recording.

Figure 2:
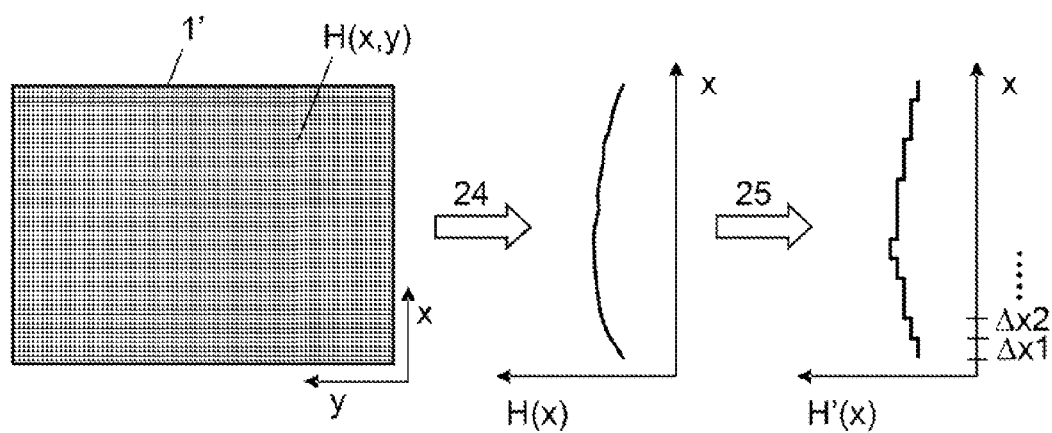
FIG. 2 is a diagrammatic illustration of the calibrating process for determining the comparison signal values.

The comparison information stored in the storage phosphor layer 1' is then read out in accordance with the way already described in greater detail above, a two-dimensional data field being obtained from comparison signal initial values H(x, y) for different locations (x, y) on the storage phosphor layer 1', as shown schematically in the left-hand part of FIG. 2.

The comparison signal initial values H(x, y) are then averaged in a first step 24 in the y direction, which in the present case corresponds to the direction of conveyance of the storage phosphor layer 1 during read out, i.e. the slow scan direction or sub scan direction. Preferably the median value is determined here from the comparison signal initial values H(x, y) obtained in the y direction with a respective fixed x coordinate. In principle any other average value formation, for example the arithmetical average, is also possible instead of the median value.

By averaging the comparison signal initial values H(x, y) in the y direction comparison signal values H(x) are obtained which only depend upon the respective x coordinate of a location on the storage phosphor layer 1. An example of the course of the comparison signal values H(x) in the x direction is shown in the central part of FIG. 2. The two-dimensional data field of the comparison signal initial values H(x, y) is in this way reduced to a one-dimensional data field of comparison signal values H(x) which requires substantially less storage space. Despite the high reduction in data in this way a high level of reliability is nevertheless guaranteed when determining the smallest possible quantity of erasing light 21.

In order to further reduce the required storage space, provision can be made in a second step 25 such that the comparison signal values H(x) are also averaged along the x direction. Preferably the comparison signal values H(x) lying in a number of sections Δx1, Δx2 . . . along the x direction are respectively averaged here so that averaged comparison signal values H'(x) are obtained for the locations lying within the respective sections Δx1, Δx2 . . . with a specific x coordinate. This is shown in the right-hand part of FIG. 2. Preferably between 80 and 120, preferably approximately 100, comparison signal values H(x) are averaged here along the x direction. Also with this averaging the median value of the respective comparison signal values H(x) lying in a section Δx1, Δx2 . . . is preferably formed. Alternatively, any other average value formation, such as e.g. the arithmetical average, is basically also possible. Depending on the number of comparison signal values H(x) averaged along the x direction in this way the storage space required for storing the averaged comparison signal values H'(x) is further reduced by a factor in the order of magnitude of 100, without however significantly effecting reliability when determining the smallest possible quantity of erasing light 21.

The calibrating process described is preferably implemented by the manufacturer, i.e. when producing and configuring the apparatus according to the invention. Comparison signal values H(x) and H'(x) for different storage phosphor layer types, such as e.g. so-called Powder Image Plates (PIP) or Needle Image Plates (NIP), can be determined here since the sensitivity of the latter to X-ray radiation and/or the erasing characteristics of the latter is generally different. Moreover, different comparison signal values H(x) and H'(x) can be determined for different radiographic applications, for example for general radiographic applications or mammography. Not least, it is possible here to determine comparison signal values H(x) and H'(x) with different X-ray radiation doses.

For example, with Powder Image Plates (PIPs) comparison signal values H(x) and H'(x) for X-ray radiation doses of 100 mR and 300 mR and for Needle Image Plates (NIPs) comparison signal values H(x) and H'(x) for just one X-ray radiation dose of 100 mR are determined.

The comparison signal values H(x) and H'(x) determined by the calibrating process carried out by the manufacturer can moreover be standardized to a so-called shading line. This shading line is a calibrating line which has been incorporated with low X-ray radiation doses of up to approximately 50 mR, and characterizes the collecting efficiency of the components upstream of the detector 7, in particular the optical collecting device 6. The advantage of this is that in the case of an apparatus repair carried out by the client, e.g. by changing components upstream of the detector 7, in particular the optical collecting device 6, only one corresponding new shading line needs to be made available by means of which the comparison signal values H(x) and H'(x) stored in the memory 14 can be re-calculated. In this way one can dispense with a new calibrating process at the works.

Figure 3:
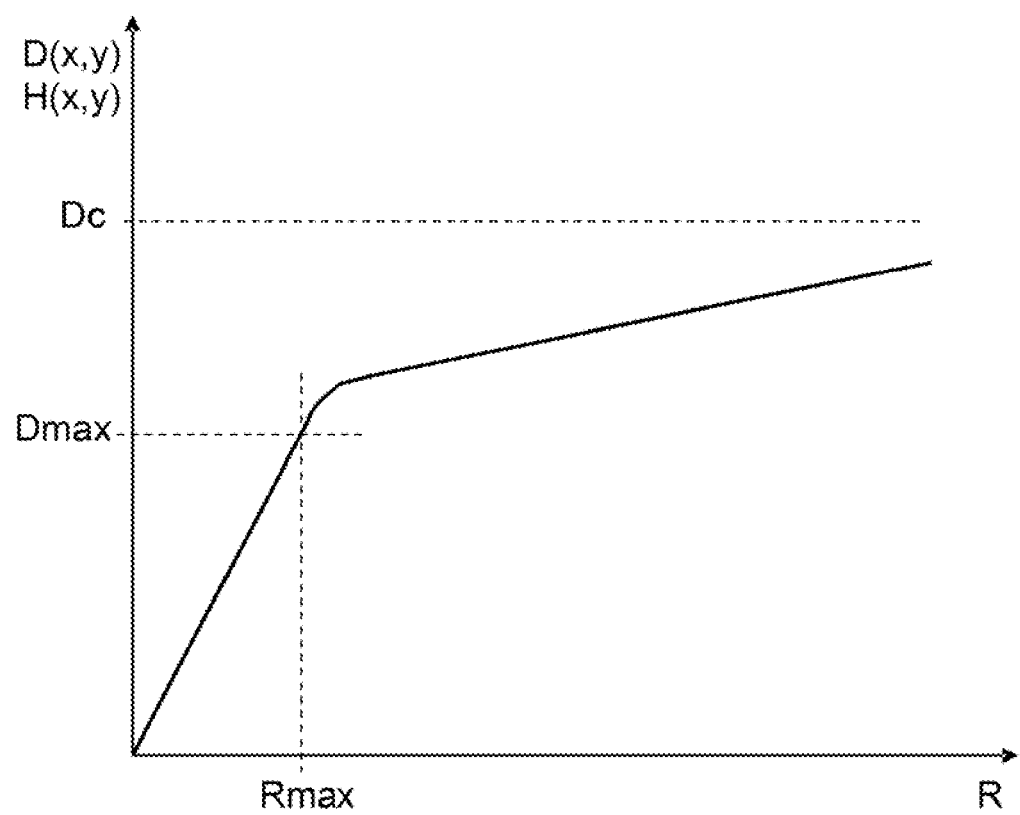
FIG. 3 is a plot showing an example of a course of the detector signal values and comparison signal initial values depending on the X-ray dose stored in the storage phosphor layer.

FIG. 3 shows an example of a typical course of the digitalized detector signal values D(x, y) and comparison signal initial values H(x, y) generated by the detector 7 and digitalized in the processing device 11 dependently upon the X-ray dose R stored in the storage phosphor layer 1.

When reading out the X-ray information stored in the storage phosphor layer 1 detector signal values D(x, y) are obtained which are substantially proportional to the X-ray dose R provided the latter is below the specified limit dose Rmax. With X-ray doses above the limit dose Rmax the sensitivity of the detector 7 is generally no longer linear. In such cases the detector signal values D(x, y) obtained here exceed a maximum detector signal value Dmax corresponding to the limit dose Rmax, and are preferably set to a specified detector signal value Dc so that the regions of the generated X-ray image in which the limit dose Rmax has been exceeded are shown consistently in black and white.

In contrast, when reading out the comparison information stored in the storage phosphor layer 1', i.e. during the calibrating process, a comparison signal initial value H(x, y) corresponding to the level of the respective stored dose of X-ray radiation is emitted, even if the limit dose Rmax of X-ray radiation stored in the storage phosphor layer 1' or the corresponding maximum detector signal value Dmax is exceeded. Therefore, with the calibrating process the detector 7 and/or the processing device 11 is controlled or operated such that in the whole region of sensitivity, in particular also in the sensitivity region lying above the limit dose Rmax and the maximum detector signal value Dmax and generally not linear, comparison signal initial values can be obtained.

This is achieved in the apparatus shown in FIG. 1 in that with the calibrating process in the digitalization device 13 either a separate analogue to digital converter is used, with which comparison signal initial values above the limit dose Rmax and the maximum detector signal value Dmax are also obtained, or the analogue to digital converter or converters provided in the digitalization device 13 are connected or operated such that comparison signal initial values above the limit dose Rmax and the maximum detector signal value Dmax are also obtained.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process for reading out and erasing X-ray information stored in storage phosphor layers, comprising:

reading out X-ray information stored in a storage phosphor layer by irradiating the storage phosphor layer with stimulation light, by means of which the storage phosphor layer is stimulated to emit emission light, and collecting the emission light emitted at different locations (x, y) of the storage phosphor layer with a detector, corresponding detector signal values (D(x, y)) being obtained; and erasing X-ray information remaining in the storage phosphor layer by irradiating the storage phosphor layer with erasing light, the quantity of erasing light with which the storage phosphor layer is irradiated being determined by comparing the detector signal values (D(x, y)) obtained for different locations (x, y) in a first and second dimension (x and y) of the storage phosphor layer to comparison signal values specified for different locations in just one dimension of the storage phosphor layer.

2. The process according to claim 1, further comprising:
choosing a first quantity of erasing light if the number of detector signal values (D(x, y)), which are greater than the corresponding comparison signal values, is not larger than a specified number, and
choosing a second quantity of erasing light, which is greater than the first quantity of erasing light, the number of detector signal values, which are greater than the corresponding comparison signal values, is larger than the specified number.

3. The process according to claim 2, wherein the specified number is between 200 and 1500.

4. The process according to claim 2, wherein the specified number is between 500 and 1000.

5. The process according to claim 1, further comprising the storage phosphor layer being irradiated with stimulation light, a stimulation light beam moving over the storage phosphor layer along a line extending in the first dimension, or the storage phosphor layer being illuminated linearly along the line, and the storage phosphor layer being moved along the second dimension.

6. The process according to claim 1, further comprising when determining the quantity of erasing light, comparing the detector signal values obtained for different locations in the first and second dimension of the storage phosphor layer with the comparison signal values specified for different locations in just the first dimension of the storage phosphor layer.

7. The process according to claim 1, wherein the comparison signal values are determined using a process comprising:
recording of comparison information in a storage phosphor layer by irradiating the storage phosphor layer with X-ray radiation of a specific intensity, and
reading out the comparison information by irradiating the storage phosphor layer with stimulation light by means of which the storage phosphor layer is stimulated to emit emission light, and collecting the emission light emitted at different locations in a first and second dimension of the storage phosphor layer with a detector, comparison signal initial values being obtained for different locations in the first and second dimension of the storage phosphor layer, wherein the comparison signal values are determined for different locations in just one dimension of the storage phosphor layer by averaging the comparison signal initial values along the other dimension of the storage phosphor layer.

8. The process according to claim 7, wherein the comparison signal values are determined for different locations in the first dimension of the storage phosphor layer by averaging the comparison signal initial values along the second dimension.

9. The process according to claim 8, wherein the comparison signal values are divided into a number of sections along the first dimension respectively being averaged so that averaged comparison signal values are obtained for the locations within the respective sections.

10. The process according to claim 9, wherein for each section along the first dimension between 50 and 200 comparison signal values are averaged.

11. The process according to claim 9, wherein for each section along the first dimension between 80 and 120 comparison signal values are averaged.

12. The process according to claim 7, wherein the comparison signal initial values and/or comparison signal values are averaged by forming the median value.

13. The process according to claim 7, wherein the comparison signal values are determined for different storage phosphor layer types and/or applications and/or X-ray radiation doses.

14. The process according to claim 7, wherein the detector signal values obtained when reading out the X-ray information stored in the storage phosphor layer are set to a specified detector signal value if a limit dose of X-ray radiation or a corresponding maximum detector signal value stored in the storage phosphor layer is exceeded, and when reading out the comparison information stored in the storage phosphor layer a comparison signal initial value corresponding to the level of the respective stored dose of X-ray radiation is outputted, even if the limit dose of X-ray radiation stored in the storage phosphor layer or the corresponding maximum detector signal value is exceeded.

15. The process according to claim 1, wherein the comparison signal values are determined using a process comprising:
recording of comparison information in a storage phosphor layer by irradiating the storage phosphor layer with X-ray radiation of an intensity which is constant in the region of the storage phosphor layer, and
reading out the comparison information by irradiating the storage phosphor layer with stimulation light by means of which the storage phosphor layer is stimulated to emit emission light, and collecting the emission light emitted at different locations in a first and second dimension of the storage phosphor layer with a detector, comparison signal initial values being obtained for different locations in the first and second dimension of the storage phosphor layer, wherein the comparison signal values are determined for different locations in just one dimension of the storage phosphor layer by averaging the comparison signal initial values along the other dimension of the storage phosphor layer.

16. An apparatus for reading out and erasing X-ray information stored in storage phosphor layers comprising:
a read-out unit for reading out X-ray information stored in a storage phosphor layer, the read-out unit comprising a stimulation light source for irradiating the storage phosphor layer with stimulation light by means of which the storage phosphor layer is stimulated to emit emission light, and a detector for collecting the emission light emitted at different locations of the storage phosphor layer, corresponding detector signal values being obtained,
an erasing device for erasing X-ray information remaining in the storage phosphor layer by irradiating the storage phosphor layer with erasing light, and
a control unit for determining the quantity of erasing light with which the storage phosphor light is irradiated, in response to the detector signal values, by comparing the detector signal values obtained for different locations in a first and second dimension of the storage phosphor layer with comparison signal values specified for different locations in just one dimension of the storage phosphor layer.

17. An apparatus for determining comparison information comprising:
an X-ray radiation source for irradiating a storage phosphor layer with X-ray radiation of a specific intensity, comparison information being recorded in the storage phosphor layer,
a read-out unit for reading out the comparison information, the read-out unit comprising a stimulation light source for irradiating the storage phosphor layer with stimulation light by means of which the storage phosphor layer is stimulated to emit emission light, and a detector for collecting the emission light emitted at different locations of the storage phosphor layer, corresponding comparison signal initial values being obtained, an erasing device for erasing X-ray information in the storage phosphor layer by irradiating the storage phosphor layer with erasing light, and a control unit for determining the comparison information for different locations in just a first dimension of the storage phosphor layer by averaging the comparison signal initial values along a second dimension of the storage phosphor layer and controlling the erasing device based on the comparison information.

18. The apparatus according to claim 17 comprising a memory in which the comparison information, in the control unit, is stored, the control unit determining a quantity of erasing light with which a storage phosphor layer is irradiated in order to erase X-ray information remaining in the storage phosphor layer using the comparison information stored in the memory.

19. The apparatus according to claim 17 wherein the X-ray radiation source irradiates the storage phosphor layer with X-ray radiation of an intensity which is constant in the region of the storage phosphor layer.

* * * * *